United States Patent [19]
Murman et al.

[11] 3,750,404
[45] Aug. 7, 1973

[54] HYDRAULIC FAIL-SAFE VALVE OPERATOR

[75] Inventors: Fernando Murman, Palos Verdes Peninsula; Lyle E. Hiatt, Long Beach, both of Calif.

[73] Assignee: Hydril Company, Los Angeles, Calif.

[22] Filed: Jan. 17, 1972

[21] Appl. No.: 218,116

[52] U.S. Cl. ............ 60/413, 60/455, 60/903, 60/DIG. 10, 60/403
[51] Int. Cl. .............................................. F15b 1/02
[58] Field of Search .............. 60/51, 52 US, 52 CD, 60/413, 455, 403, DIG. 10

[56] References Cited
UNITED STATES PATENTS

| | | |
|---|---|---|
| 2,746,251 | 5/1956 | Ashton .............................. 60/51 X |
| 2,867,086 | 1/1959 | Haley ................................ 60/51 X |
| 2,881,739 | 4/1959 | Huppert ............................ 60/51 X |
| 3,237,406 | 3/1966 | Spannhake et al. ............... 60/51 X |
| 3,693,348 | 9/1972 | Mercier ............................. 60/51 X |

*Primary Examiner*—Edgar W. Geoghegan
*Attorney*—H. Calvin White, William W. Haefliger et al.

[57] ABSTRACT

The invention relates generally to the control of sub-surface oil tools. A fail-safe operator for such tools is characterized as hydraulically operated and adapted to be connected in a system wherein hydraulic fluid is not wasted to the sea, in order to obviate contamination problems.

12 Claims, 9 Drawing Figures

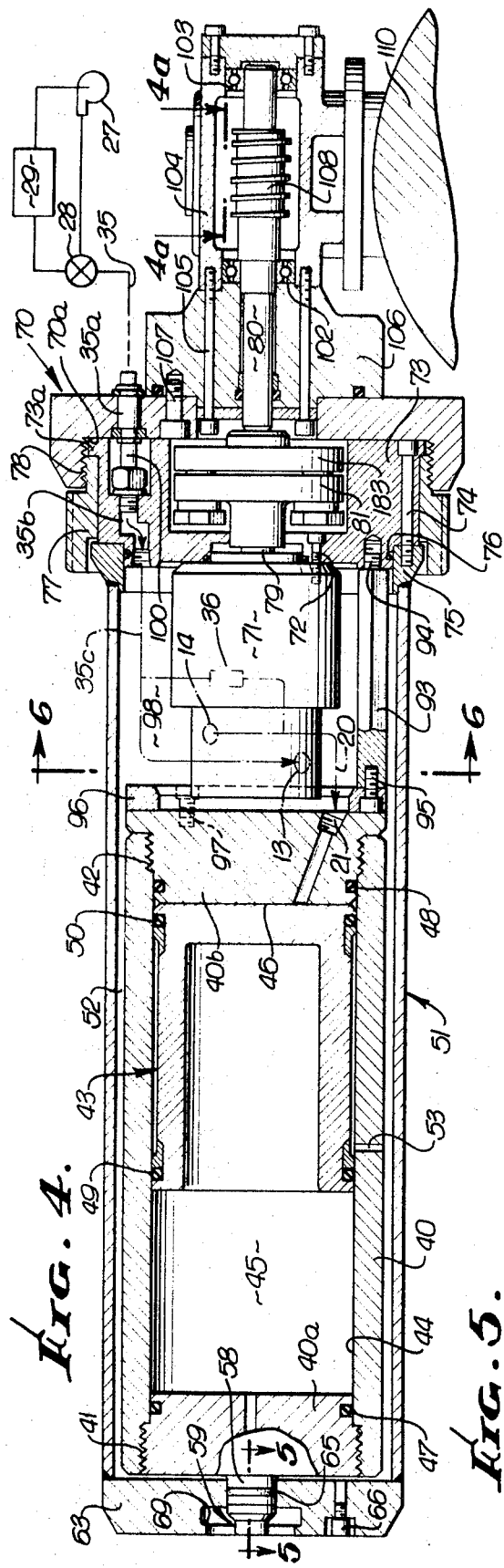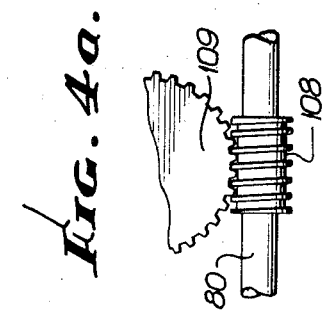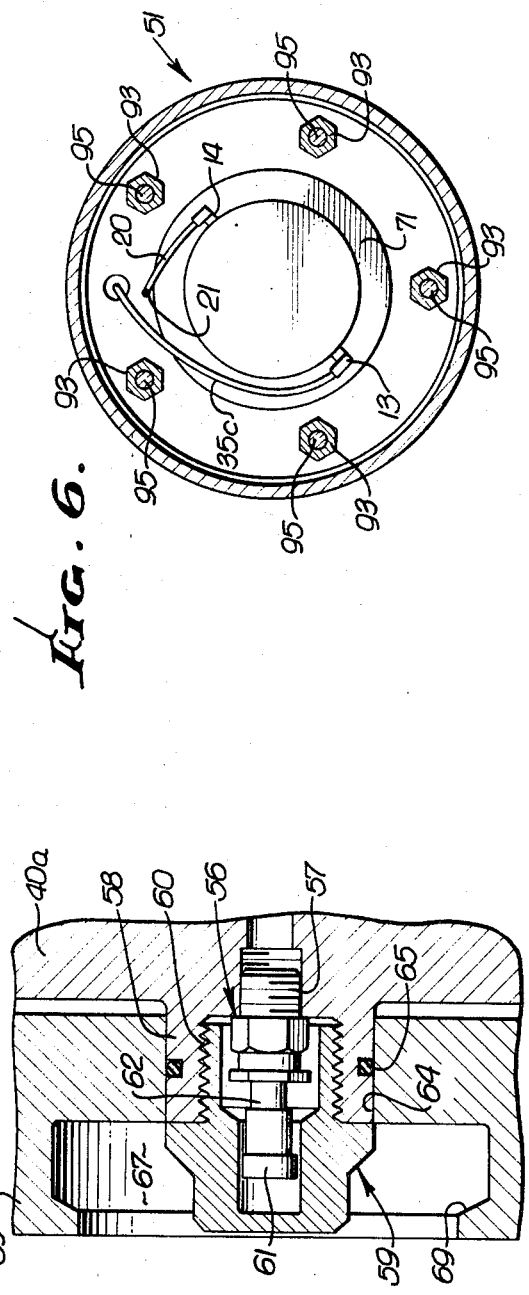

HYDRAULIC FAIL-SAFE VALVE OPERATOR

BACKGROUND OF THE INVENTION

This invention relates generally to the control of sub-surface oil tools, and more particularly concerns the provision of a fail-safe operator for such tools characterized as hydraulically operated and adapted to be connected in a system wherein hydraulic fluid is not wasted to the sea, in order to obviate contamination problems.

In the operation of sub-sea wells, oil tools such as blow-out preventers, hydraulic rams, and other equipment of this nature are conventionally connected in a stack at the sub-surface well head location. Valves controlling fluid flow to such tools are themselves preferably driven by hydraulic motors. There is a need for supplying hydraulic fluid to such motors in such a way that in the event of failure of hydraulic pressure, the motors will be automatically operated in a fail-safe "direction," that is, a direction associated with consequent operation of the oil tools to seal off the underwater well. Also, the hydraulic systems should be characterized as not wasting hydraulic fluid to the sea, so as not to contaminate same. There is also a need for apparatus capable of functioning in the above manner, and characterized as free of motor sealing problems arising due to undesired application of hydraulic fluid pressure across the motor, simple, easily operable, and capable of removal and replacement of the accumulator/motor portion of the system, at an underwater location.

SUMMARY OF THE INVENTION

It is a major object of the invention to provide hydraulically operated apparatus meeting the above needs, the apparatus characterized by unusually advantageous construction, mode of operation and result. Basically, the invention is embodied in the combination that includes: a reversible hydraulic motor having parts through which pressurized hydraulic fluid is flowable during motor operation; hydraulic pressure accumulator means connected with the motor to receive pressurized hydraulic fluid flowing during motor operation acting to operate the valve to one of two positions, and to discharge hydraulic fluid flowing during motor operation acting to operate the valve to the other of the two positions, and ducting connected to by-pass the flow of hydraulic fluid around the motor, and with restriction, subsequent to motor operation. Typically the restriction may be provided by an orifice in the ducting, and acting to pass by-pass fluid pressure around the motor to equalize the pressure at the motor inlet and outlet ports, so as to avoid loading of the motor and seals after the motor has stopped rotating.

Further, the accumulator may contain gas under predetermined pressurization, a hydraulic fluid pressure source may comprise a pump, and an enclosed reservoir may be provided to receive hydraulic fluid subject to discharge from the accumulator, the pump taking suction from the reservoir to provide a closed hydraulic system.

Additionally, the accumulator/motor means may be releasably connected to underwater mounting structure, enabling retrieval of the accumulator/motor for recharging with gas pressure. As will be seen, such structure may include a base through which a hydraulic fluid connection to the accumulator/motor may be provided.

These and other objects and advantages of the invention, as well as the details of an illustrative embodiment, will be more fully understood from the following description and drawings, in which:

DRAWING DESCRIPTION

FIG. 4 is a section taken on lines 4—4 of FIG. 2;

FIG. 4a is a fragmentary section taken on lines 4a—4a of FIG. 4;

FIG. 5 is an enlarged section taken on lines 5—5 of FIG. 4;

FIG. 6 is a section taken on lines 6—6 of FIG. 4;

DETAILED DESCRIPTION

Figure 3:
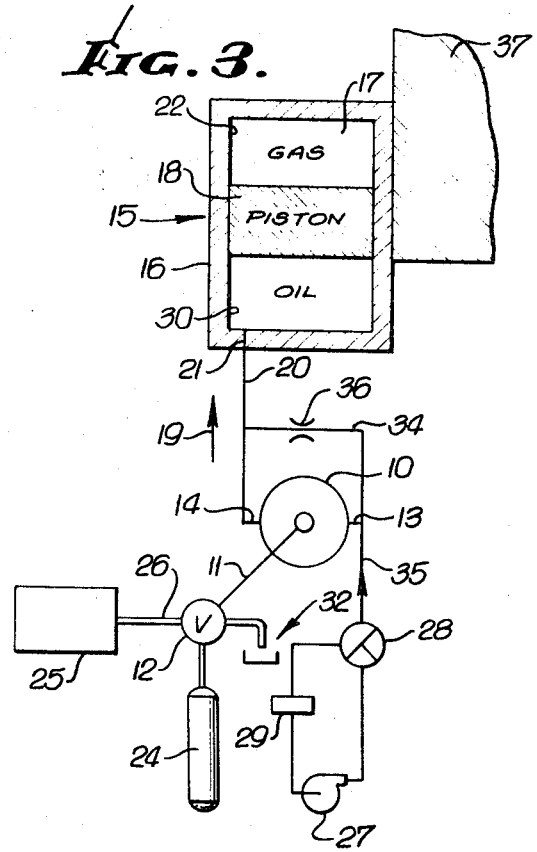
FIG. 3 is a diagramatic view of a system in which the operator is incorporated.
Figure 7:
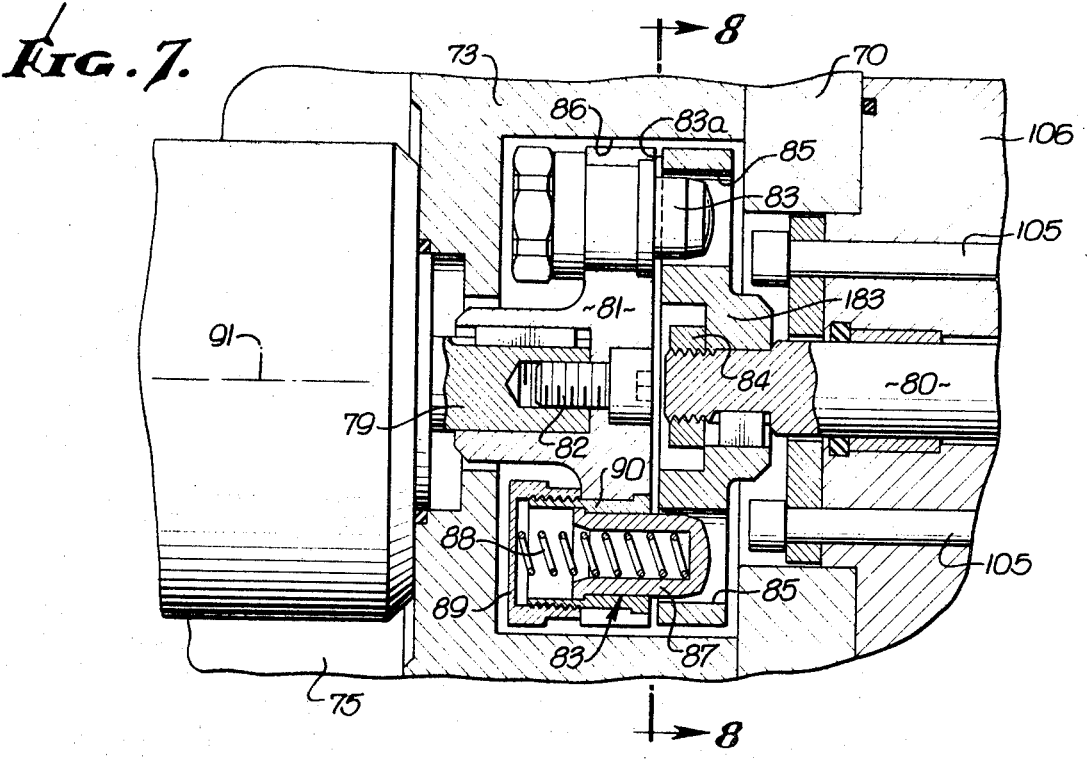
FIG. 7 is an enlarged section taken through a portion of FIG. 4.

Referring first to FIG. 3, a reversible hydraulic motor 10 is connected at 11 with a valve 12, to operate it between two positions, as for example open and closed. Valve 12 may typically comprise a rotary plug valve. The motor may typically have ports at 13 and 14 through which hydraulic fluid is flowable during motor operation. Connection 11 may comprise a rotary shaft.

Hydraulic pressure accumulator means, as for example that indicated at 15, is connected with the motor to receive pressurized fluid flowing during motor operation acting to operate the valve to one of the two positions, and to discharge pressurized fluid flowing during motor operation acting to operate the valve to the other of the two positions. Such accumulator means may comprise a cylinder 16 containing gas 17 under predetermined pressurization, and a piston 18, or other device, movable within the cylinder in response to hydraulic fluid flow through the motor. Thus, when the hydraulic fluid flow is from a source of pressure (as for example the pump 27 discharging to control valve 28) greater than the pressure of gas 17, the direction of flow is indicated by arrow 19, the hydraulic fluid entering the cylinder via duct 20 and port 21 to urge the piston toward the gas chamber 22, increasing the gas pressure. Under these conditions, the valve 12 may be moved to open condition, thereby to pass fluid pressure in a pipeline 26 from a source 24 to an underwater oil tool 25, as shown.

The pipeline control valve 28 has a second position in which the pressure source 27 is no longer in communication with the motor 10, the port 13 of the latter then being connected via the valve 28 with reservoir 29. Under these conditions, the greater pressure of gas in chamber 22 causes the piston 18 to discharge hydraulic fluid from chamber 30 to the reservoir 29 via the hydraulic motor 10. The latter accordingly rotates reversely and drives valve 12 to "closed" position. Valve 12 may comprise a three-way valve in which event the gas pressure supplied to the tool 25 is exhausted to the sea as indicated at 32, when the valve is in such "closed" position. This provides for fail-safe operation in the event hydraulic pressure from pump 27 is lost.

It will be noted that the hydraulic fluid portion of the system does not function to discharge hydraulic fluid to the sea (i.e. does not contaminate the sea), since the pump 27 has its intake connected with reservoir 29. While any suitable reversible hydraulic motor may be used at 10, one typical motor is that manufactured by Houdaille Industries, Inc., and described in Bulletin 1040A of that company.

It will further be observed that the invention contemplates the provision of ducting connected to by-pass the flow of hydraulic fluid around or past the motor 10, and with restriction, during and subsequent to motor operation. For example, as seen in FIG. 3, ducting 34 is connected between lines 35 and 20, and an orifice 36 is provided in duct 34. In operation, the orifice passes only a small amount of fluid during the time the motor 10 is passing the great bulk of the fluid, while operating forwardly or reversely. On the other hand, after the motor has completed its rotation to operate the valve 12 to either open or closed position, the orifice 36 continues to pass pressurized fluid until the pressure differential across it is eliminated. This relieves the pressure differential across the motor, after motor rotation has been stopped at valve 12 open or closed positions, to prevent damage to seals and associated motor structure, thereby to extend the life of the underwater equipment. Structure 37 in FIG. 3 represents underwater support for the accumulator 15, and associated structure 10, 28, 27, 29, and 12.

Extending the description to FIGS. 1, 2 and 4–8, an accumulator (corresponding to that at 15, previously described) includes a cylinder 40 with end caps 40a and 40b having threaded connection at 41 and 42 to the cylinder; and a piston 43 slidable endwise in the cylinder bore 44 and forming therewith a pressurized gas chamber 45 and a pressurized hydraulic fluid chamber 46. Suitable O-ring seals appear at 47–50. A cylindrical housing 51 contains the cylinder 40 and extends coaxially therewith, with annular spacing at 52 providing a sump to receive any leakage of gas or hydraulic fluid from the accumulator, via port 53 in the cylinder wall and which remains straddled by seals 49 and 50 carried by the piston in all endwise positions of the latter.

Figure 1:
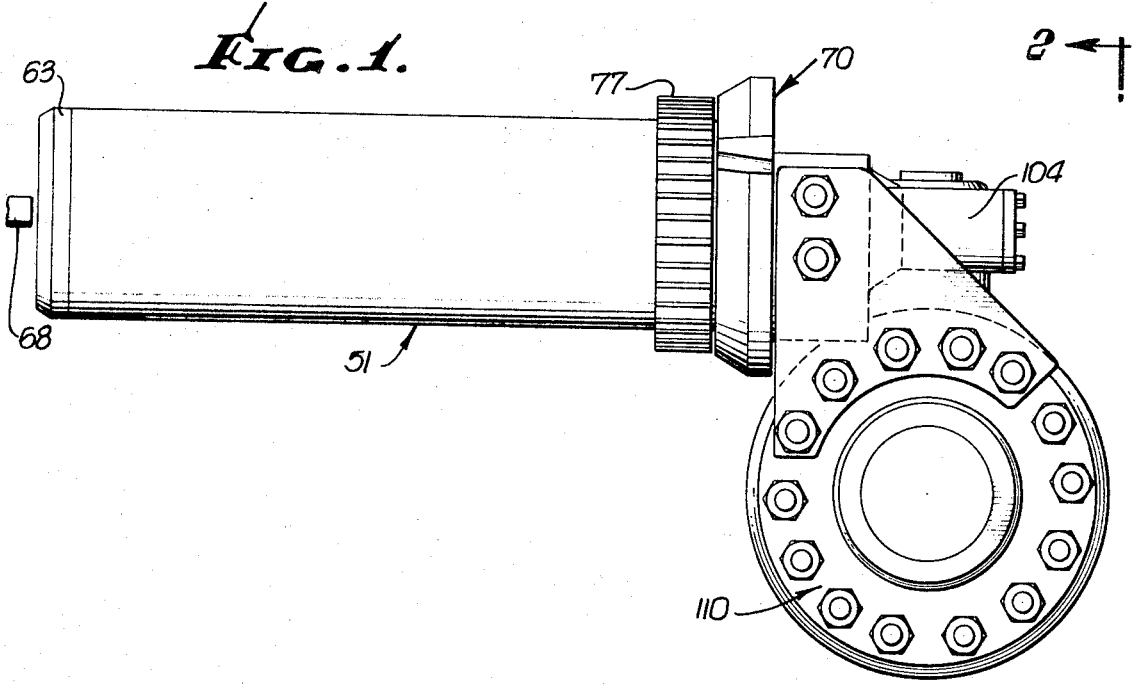
FIG. 1 is an elevational view showing an operator incorporating the invention.
Figure 2:
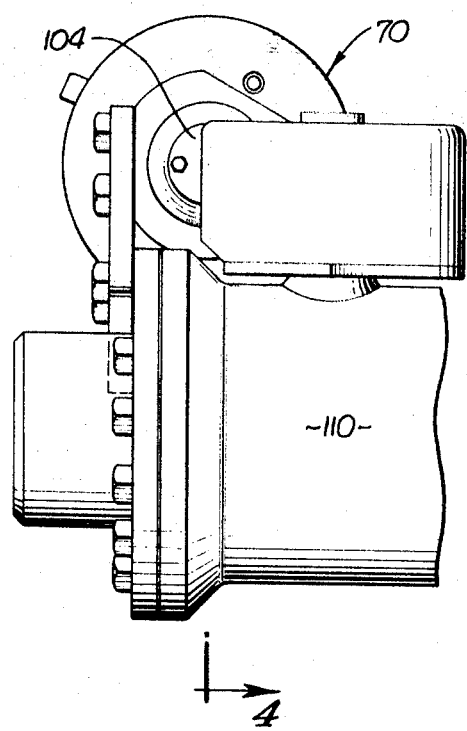
FIG. 2 is a fragmentary elevation taken on lines 2—2 of FIG. 1.

Pressurized gas is pre-charged into the chamber 45 via an inlet check valve indicated at 56, and which may be of "tire valve" type. For this purpose, the valve may have thread connection at 57 to the cap 40a and extend within a nipple 58 formed by that cap. A protective removable cap 59 has threaded connection to the nipple at 60, and may be removed to expose the cap 61 of the valve 56, and removably connected on stem 62. After removal of cap 61, compressed gas, as for example nitrogen, may be delivered to chamber 45 via a fitting received on stem 62. A closure 63 forming part of the housing 51, at one end thereof, closely receives the nipple via bore 64, and a seal 65 seals off therebetween. A check valve 66 in the closure 63 releases any build-up of gas pressure in space 52; and, a recess 67 in the closure is adapted to receive a tool 68 engageable with shoulder structure 69 to retract the housing and accumulator relative to a base 70, as best seen in FIG. 1.

The housing 51 also receives hydraulic motor 71 (corresponding to motor 10 in FIG. 3), the motor being attached, as by fasteners 72, to the annular support 73. The latter is also connected by fasteners 74 to a carrier ring 75 annularly attached to the housing cylinder 51 at the end thereof opposite closure 63, there being an O-ring seal 76 between ring 75 and support 73. Accordingly, the accumulator and housing assembly may be releasably connected to this cup-shaped base as by rotating an annular retainer 77 into threaded engagement with the base at 78, the retainer urging a flange 73a on support 73 into engagement with the interior face 70a of the base 70.

Figure 8:
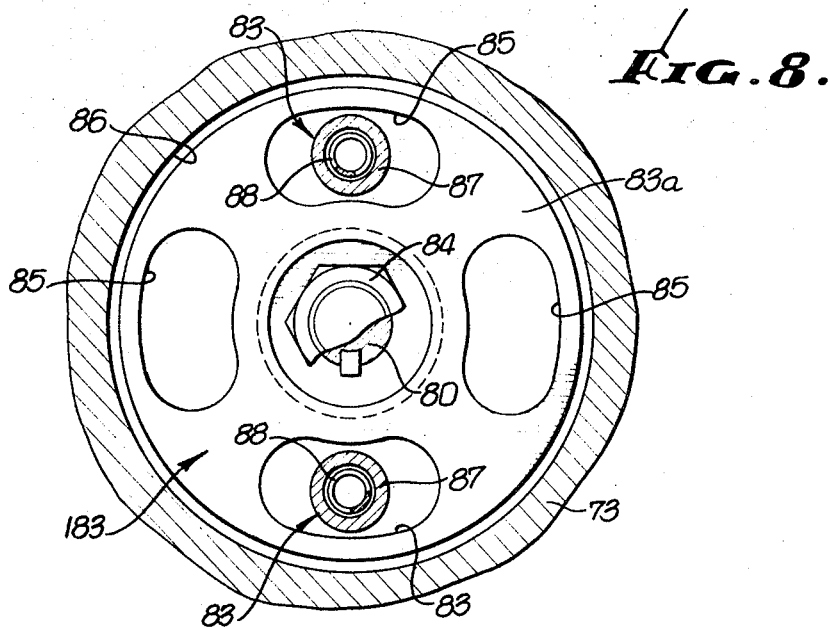
FIG. 8 is a section taken on lines 8—8 of FIG. 7.

During such make-up, the output shaft 79 on the motor 71 is releasably coupled in driving relation with the intermediate transmission shaft 80 by mechanism now to be described. An annular driving coupling plate 81 is retained by fastener 82 to shaft 79, and carries a circular series of drive pins 83 spaced about the axis of shaft 79. An annular driven coupling plate 183 is retained by a fastener nut 84 to the end of driven shaft 80, and has formed therein a circular series of slots or recesses 85 (as best seen in FIG. 8) to removably receive pins 83. This structure is received in a recess 86 in plate 73.

Pins 83 include hollow shanks 87 urged by springs 88 into the slots 85, there being heads 89 on the pins threaded on sleeves 90 to retain the latter on the plate 81. The shanks may, accordingly, be deflected leftwardly in FIG. 7 upon initial engagement with face 83a of plate 183 during make-up; and thereafter as the pins and plate 81 are rotated about axis 91 relative to plate 183, the pin shanks will snap into corresponding recesses 85 to accomplish the coupling. This construction ensures that the pins will not be destroyed upon initial engagement with plate 183. Recesses 85 are circularly elongated about axis 91, and may exceed the number of pins to minimize the degree of relative rotation of plate 81 relative to plate 83 required to complete the intercoupling.

Reference to FIG. 4 will show that the accumulator cylinder 40 may be attached to support plate 73 as by means of a circular series of spacer bars 93. These have fastener attachment at 94 to plate 73, and fastener attachment at 95 to a ring 96, in turn attached at 97 to end cap 40b. Accordingly, a chamber 98 is formed to receive the motor 71 endwise of the accumulator and between the latter and the base 70 to which the accumulator is releasably attached.

During make-up of the coupling, an hydraulic fluid connection is established between duct fitting 35a in the base 70, and duct 35b in the plate 73. For this purpose, a nipple 100 carried by the plate 73 may penetrate a fitting 35a, to establish a self-sealing connection. Ducts 35, 35a, 35b and 35c correspond to duct 35 in FIG. 3; and elements 13, 14, 36, 20 and 21 correspond to the same numbered elements of FIG. 3.

Shaft 80 is bearing supported at 102 and 103 within a body 104 connected at 105 to a boss 106, which is in turn connected at 107 to base 70. A worm gear 108 on shaft 80 drives a spur gear 109, as seen in FIG. 4a, and gear 109 drives or rotates a plug valve in housing 110 seen in FIGS. 1 and 2. That valve corresponds to valve 12 in FIG. 3. Valves 110 and 12 may also be generally connected in pipelines other than that indicated at 26 in FIG. 3.

I claim:

1. For use in operating an underwater valve between two positions, the combination comprising:
   a. a reversible hydraulic motor having ports through which pressurized hydraulic fluid is flowable during motor operation, b. hydraulic pressure accumulator means connected with the motor to receive pressurized hydraulic fluid flowing during motor operation acting to operate the valve to one of said two positions, and to discharge pressurized hydraulic fluid flowing during motor operation acting to operate the valve to the other of said two positions, and c. ducting connected to by-pass the flow of hydraulic fluid around the motor, and with restriction, subsequent to motor operation.

2. The combination of claim 1 including an orifice in said ducting providing said restriction.

3. The combination of claim 1 wherein the accumulator contains gas under pre-determined pressurization, and including a source of said hydraulic fluid under pressure.

4. The combination of claim 1 wherein the motor has a rotary output shaft, and including said underwater valve connected with said shaft.

5. The combination of claim 4 including an underwater support for said valve, a source of fluid pressure connected with the valve, and an underwater tool connected with the valve to receive actuating fluid pressure from said fluid source when the valve is operated to open position by the motor.

6. The combination of claim 1 including a housing containing the motor, an accumulator cylinder within the housing, and an accumulator piston movable within the cylinder in response to hydraulic fluid flow through the water.

7. The combination of claim 1 including structure to which said accumulator means is releasably connected, the accumulator means having an hydraulic fluid receiving chamber connected with said ducting via said structure.

8. The combination of claim 6 including a base to which said housing is releasably connected, the accumulator means having an hydraulic fluid receiving chamber connected with said ducting via said structure.

9. The combination of claim 3 wherein said source comprises a pump, and including an enclosed reservoir to which fluid subject to said discharge is flowable, and from which said pump takes suction.

10. In combination,
a. a housing,
b. an accumulator cylinder and a reversible hydraulic motor within the housing, and a displaceable member within the cylinder and forming therewith a first chamber to receive pressurized gas and a second chamber to receive pressurized hydraulic fluid via the motor,
c. a base releasably mounting the housing and through which hydraulic fluid may pass into and out of said second chamber via the motor, and
d. ducting connected to by-pass the flow of hydraulic fluid around the motor, and with restriction, as said fluid passes out of the second chamber.

11. In combination,
a. a housing,
b. an accumulator cylinder and a reversible hydraulic motor within the housing, and a displaceable member within the cylinder and forming therewith a first chamber to receive pressurized gas and a second chamber to receive pressurized hydraulic fluid via the motor,
c. a base releasably mounting the housing and through which hydraulic fluid may pass into and out of said second chamber via the motor, and
d. and a pin and box connection located to be made up proximate the base in response to releasable mounting of the housing to the base so that the connection is then adapted to pass said hydraulic fluid.

12. In combination,
a. a housing,
b. an accumulator cylinder and a reversible hydraulic motor within the housing, and a displaceable member within the cylinder and forming therewith a first chamber to receive pressurized gas and a second chamber to receive pressurized hydraulic fluid via the motor,
c. a base releasably mounting the housing and through which hydraulic fluid may pass into and out of said second chamber via the motor, and
d. said member being defined by a piston movable endwise in the accumulator cylinder, there being a port through the cylinder wall to pass leakage of said gas to a space defined between the cylinder and housing, there also being means sealing off between the piston and cylinder and straddling said port in all positions of the piston.

* * * * *